No. 873,457. PATENTED DEC. 10, 1907.
A. H. READE.
NUT LOCK.
APPLICATION FILED AUG. 27, 1907.
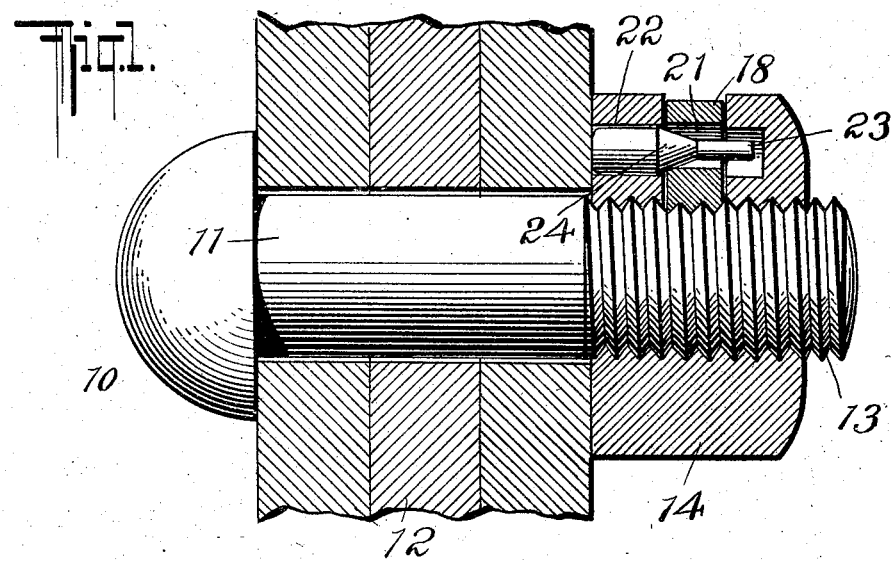
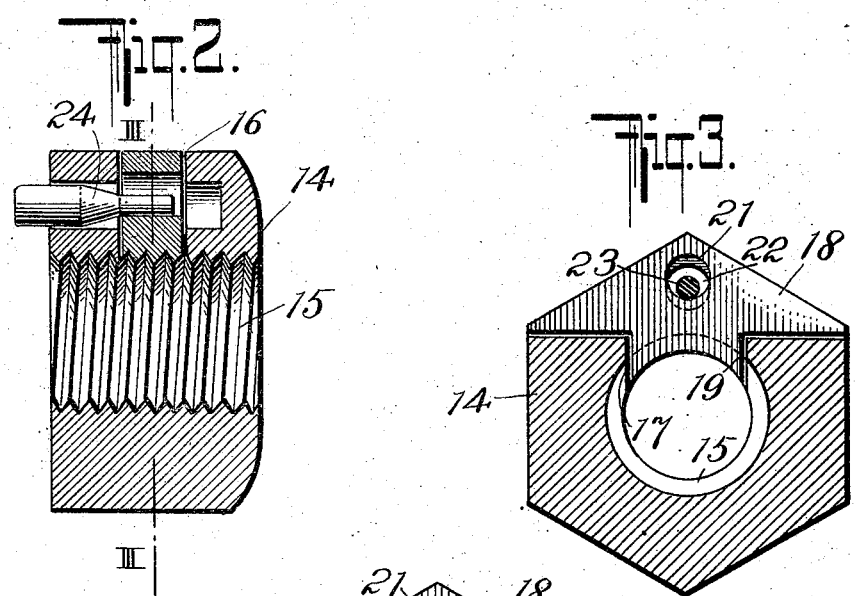
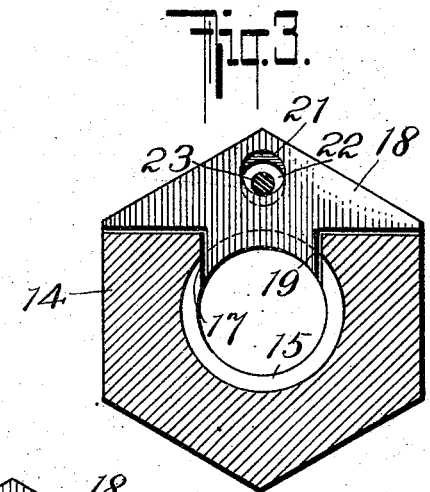
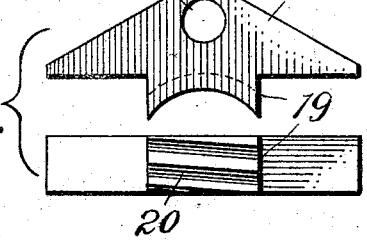
WITNESSES
INVENTOR
Arthur H. Reade
BY
Criswell & Criswell
ATTORNEYS

UNITED STATES PATENT OFFICE.

ARTHUR H. READE, OF NEW YORK, N. Y.

NUT-LOCK.

No. 873,457.　　　Specification of Letters Patent.　　　Patented Dec. 10, 1907.

Application filed August 27, 1907. Serial No. 390,330.

*To all whom it may concern:*

Be it known that I, ARTHUR H. READE, a subject of the King of England, and a resident of New York, county and State of New York, have invented certain new and useful Improvements in Nut-Locks, of which the following is a full, clear, and exact description.

This invention relates more particularly to a nut having a movable locking member.

The primary object of the invention is to provide a simple and efficient device in which the nut has a threaded block or member slidingly held within a slotted portion of the nut and which is adapted to be forced into engagement with the threads of a bolt to bind and rigidly hold the nut in a locked position as the nut is forced along the threads of the bolt to engage the surface of the means to be fastened.

A further object of the invention is to provide a nut which is inexpensive to manufacture, and in which the locking member will conform to the shape of the nut so that the latter will not be altered in appearance.

The invention will be hereinafter more particularly described with reference to the accompanying drawings, which form a part of this specification, and will then be pointed out in the claims at the end of the description.

In the drawings, Figure 1 is a sectional view of the nut in a locked position. Fig. 2 is a detail sectional view, similar to Fig. 1, except that the nut has its locking member in a released position. Fig. 3 is a sectional view, partly in elevation, taken on the line III—III of Fig. 2; and Fig. 4 represents a plan and an edge view respectively of the locking or clamping member of the nut.

The bolt 10 may be of any suitable construction and has its body portion 11 passed through the parts 12 to be held, and has the usual threaded end 13. On the end 13 is a nut 14, either square, hexagonal, or of any suitable form, and which has the usual threaded opening 15 to engage the threads of the bolt in the usual way.

To lock the nut on the bolt, the nut is provided with a slot 16 substantially midway of its thickness, and which extends from the periphery thereof across the nut to substantially the depth of the threads. This slot 16 extends transversely of the opening 15 and has a part 17 projecting inward so as to remove part of the threads of the nut thereby making the slot substantially T-shaped. In this slot is adapted to move a locking block or member 18 which has a straight part 19, the latter being threaded, as at 20, on its inner surface so as to form a continuation of the threads 15 of the nut. This locking or clamping block or member 18 has its body formed to the shape of the nut so that when in position, the nut will present the same appearance as the usual nut, and said locking member has an aperture 21 therein which is adapted to be brought into alinement with an aperture 22 in the nut when in locked position, the said aperture extending a part of the thickness of the nut, or if desired it may extend entirely therethrough. A pin or device 23 having a wedge-shaped part 24, is adapted to fit into the aperture 22 of the nut and to have a part thereof enter the opening or aperture 21 of the block 18. As will be seen, when the nut 14 is screwed home, the device 23 will engage the surface of the parts to be clamped by the bolt and nut and will force the device 24 inward, and by reason of the wedge-shaped part 24 of the device 23, the threaded block will be forced into engagement with the threads of the bolt so as to positively lock the nut to the bolt, the nut being released by turning the same with sufficient force to slightly release the locking member.

From the foregoing it will be seen that simple and efficient means is provided whereby a nut may be quickly and effectively locked on a bolt, and that said device may be employed in connection with the usual form of nut without altering its general appearance.

Having thus described my invention, I claim as new and desire to secure by Letters Patent:—

1. The combination with a bolt, of a nut having a threaded opening fitting said bolt, a slot extending across the nut transversely of the threaded opening so as to remove a part of the threads in said opening and an aperture extending transversely of the slot, a locking member slidingly held in the slot in the nut and having a threaded inner surface corresponding to the threads of the nut and provided with an aperture therethrough adapted to be forced into alinement with said aperture in the nut, and a device having a wedge-shaped portion adapted to engage the locking member and force the same inward into clamping engagement with the bolt when the nut is forced against the object to be held.

2. A device of the character described, comprising a nut having a threaded opening and provided with a slot extending across the nut transversely of the threaded opening so as to remove a part of the threads in said opening and an aperture extending transversely of the slot parallel with the threaded opening, a locking member slidingly held in the slot in the nut and having a threaded inner surface corresponding to the threads of the nut and provided with an aperture adapted to be forced into alinement with said aperture in the nut, and a device entering the apertures and adapted to engage the locking member and force the same inward into clamping position.

3. A device of the character described, comprising a nut having a threaded opening and provided with a slot extending across the nut substantially midway of its thickness and transversely of the threaded opening so as to remove a part of the thread in said opening and an aperture extending transversely of the slot, a substantially T-shaped locking block slidingly held in the slot in the nut and having a threaded inner surface corresponding to the threads of the nut and provided with an aperture therethrough adapted to be forced into alinement with said aperture in the nut, and a pin having a wedge-shaped portion entering the apertures of the block and nut and adapted to engage the locking block and force the same inward into clamping position.

This specification signed and witnessed this 24th day of August A. D. 1907.

ARTHUR H. READE

Witnesses:
M. TURNER,
L. H. LUNDIN.